(12) United States Patent  
Biesenthal et al.

(10) Patent No.: US 8,364,503 B1  
(45) Date of Patent: *Jan. 29, 2013

(54) METHOD AND SYSTEM FOR CHARGING CUSTOMERS FOR PRESCRIPTION ALIGNMENT

(75) Inventors: Amy C. Biesenthal, Buffalo Grove, IL (US); Greg Pankow, Morton Grove, IL (US)

(73) Assignee: Walgreen Co., Deerfield, IL (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/694,974

(22) Filed: Jan. 27, 2010

Related U.S. Application Data

(63) Continuation-in-part of application No. 12/275,891, filed on Nov. 21, 2008.

(60) Provisional application No. 61/147,699, filed on Jan. 27, 2009.

(51) Int. Cl.
*G06Q 10/00* (2006.01)
(52) U.S. Cl. ................................................ 705/3; 705/2
(58) Field of Classification Search .................. 705/2, 3
See application file for complete search history.

(56) References Cited

U.S. PATENT DOCUMENTS

| | | | |
|---|---|---|---|
| 5,845,255 A * | 12/1998 | Mayaud | 705/3 |
| 7,856,363 B2 | 12/2010 | Palazzolo et al. | |
| 2008/0308445 A1 | 12/2008 | Dolak | |
| 2009/0030719 A1 | 1/2009 | Nadas et al. | |
| 2009/0030720 A1 | 1/2009 | Nadas et al. | |
| 2009/0030725 A1 * | 1/2009 | Nadas et al. | 705/3 |
| 2009/0043608 A1 | 2/2009 | Nadas et al. | |
| 2009/0043610 A1 | 2/2009 | Nadas et al. | |
| 2009/0043611 A1 | 2/2009 | Nadas et al. | |

OTHER PUBLICATIONS

Salganie, M. William, "A Pill on Time Seems to Help the Bottom Line", Sep. 9, 2002, The Baltimore Sun, Business.
Office action for U.S. Appl. No. 11/781,926 dated Feb. 11, 2011.
U.S. Appl. No. 12/942,779, filed Nov. 9, 2010 entitled, "Method and System for Aligning a Plurality of Refill Dates for Prescriptions Associated with a Plurality of Customers."
U.S. Appl. No. 12/900,728, filed Oct. 8, 2010 entitled "Method and System for Delivering to a Customer a Plurality of Prescriptions Having Aligned Refill Dates."
U.S. Appl. No. 12/275,891, filed Nov. 21, 2008, on behalf of Pankow et al., entitled "Method and System for Enrolling in a Medication Compliance Packaging Program".
U.S. Appl. No. 11/781,938, filed Jul. 23, 2007, on behalf of Nadas et al., entitled "Method and System for Delivering to a Customer a Plurality of Prescriptions Having Aligned Refill Dates".
U.S. Appl. No. 11/926,817, filed Oct. 29, 2007, on behalf of Lewis, entitled "Method of Increasing Compliance of a Medication Within a Multi-Dose Blister Pack".

(Continued)

*Primary Examiner* — Robert Morgan
*Assistant Examiner* — Maroun Kanaan
(74) *Attorney, Agent, or Firm* — Francis C. Kowalik; Marshall, Gerstein & Borun LLP; Randall G. Rueth

(57) ABSTRACT

A system and method facilitate alignment of refill dates associated with a plurality of prescriptions, and determine the cost to the customer for the alignment of the plurality of prescriptions. The system may determine the cost to the customer by evaluating one or more of the number of prescriptions aligned, the types of medications prescribed by the aligned prescriptions, the quantity of medication supplied in any intermediate fills between the last adjudication date and the alignment adjudication date, the particular medications prescribed by the aligned prescriptions, and the number of prescriptions aligned. The system may also evaluate one or more rules or contracts related to one or more third-party payors in determining the cost to the customer for alignment.

20 Claims, 4 Drawing Sheets

OTHER PUBLICATIONS

U.S. Appl. No. 12/276,053, filed Nov. 21, 2008, on behalf of Ali et al., entitled "Method and System for Calculating an Alignment Date for Prescriptions".

U.S. Appl. No. 12/276,073, filed Nov. 21, 2008, on behalf of Ali et al., entitled "Method and System for Aligning Prescriptions to a User-Selected Date".

U.S. Appl. No. 60/963,871, filed Aug. 31, 2006, on behalf of Nadas et al., entitled "Comprehensive Medication Management System".

U.S. Appl. No. 60/940,790, filed May 30, 2007, on behalf of McGonagle et al., entitled "Multi-Dose Filling Machine and Process".

* cited by examiner

METHOD AND SYSTEM FOR CHARGING CUSTOMERS FOR PRESCRIPTION ALIGNMENT

RELATED APPLICATIONS

This application claims priority under 35 U.S.C. §. 119(e) to U.S. Provisional Application No. 61/147,699, entitled "METHOD AND SYSTEM FOR CHARGING CUSTOMERS FOR PRESCRIPTION ALIGNMENT", filed Jan. 27, 2009, and also claims priority as a continuation-in-part under 35 U.S.C. §120 of U.S. patent application Ser. No. 12/275,891, entitled "METHOD AND SYSTEM FOR ENROLLING IN A MEDICATION COMPLIANCE PACKAGING PROGRAM", filed on Nov. 21, 2008, and the entirety of both applications is hereby incorporated herein by reference. U.S. patent application Ser. No. 12/275,891 incorporates by reference each of the following applications relating to and further describing various aspects of the embodiments disclosed in the present application, and each of which this application hereby incorporates herein by reference: U.S. patent application Ser. No. 11/781,926, entitled "SYSTEM AND METHOD OF PRESCRIPTION ALIGNMENT," and filed on Jul. 23, 2007; U.S. patent application Ser. No. 11/959,430, entitled "COMPREHENSIVE MEDICATION MANAGEMENT SYSTEM", filed on Dec. 18, 2007; and U.S. patent application Ser. No. 12/276,053, entitled "METHOD AND SYSTEM FOR CALCULATING AN ALIGNMENT DATE FOR PRESCRIPTIONS", filed on Nov. 21, 2008. Co-filed U.S. patent application Ser. No. 12/694,968, entitled "METHOD AND SYSTEM FOR CALCULATING AN ALIGNMENT DATE FOR PRESCRIPTIONS", is also hereby incorporated herein by reference.

TECHNICAL FIELD

The present disclosure generally relates to a prescription alignment system and, in particular, relates to a method and system for determining the cost charged to customers for aligning fill dates for a plurality of prescription medications.

BACKGROUND

Generally, customers fill prescription medication orders (hereinafter, "prescriptions") on the day on which they are prescribed, or shortly thereafter. Because prescriptions may be written and filled at different times, and for different quantities of medication, it is common for a customer with multiple prescriptions to run out of the prescribed medications at varying times. Ordering and picking up refills for the various prescriptions at different times may be an inconvenience for a customer, for example, where the store location is not convenient, where a customer depends on others to pick up the prescription, or where a customer's schedule does not coincide with the pharmacy schedule. Additionally, many customers may be unable to remember multiple dates on which they must order or pick up prescription refills. This may affect the customer's health, as it may lead to missed or skipped doses of medication. Mail order and call-center-based services mitigate or alleviate some of these problems, but it is still incumbent on customers to remember to order the refills of their prescriptions. Various rules promulgated by third-parties, such as insurance companies or regulatory agencies, place restrictions on the periods during which a pharmacy may refill prescriptions or on the amount of medication that the pharmacy may dispense in a given time period, further complicating the situation. In order to align the various prescriptions, one or more prescriptions may require modified quantities of medication in order for the refill dates for each prescription to align.

DETAILED DESCRIPTION

Figure 1A:
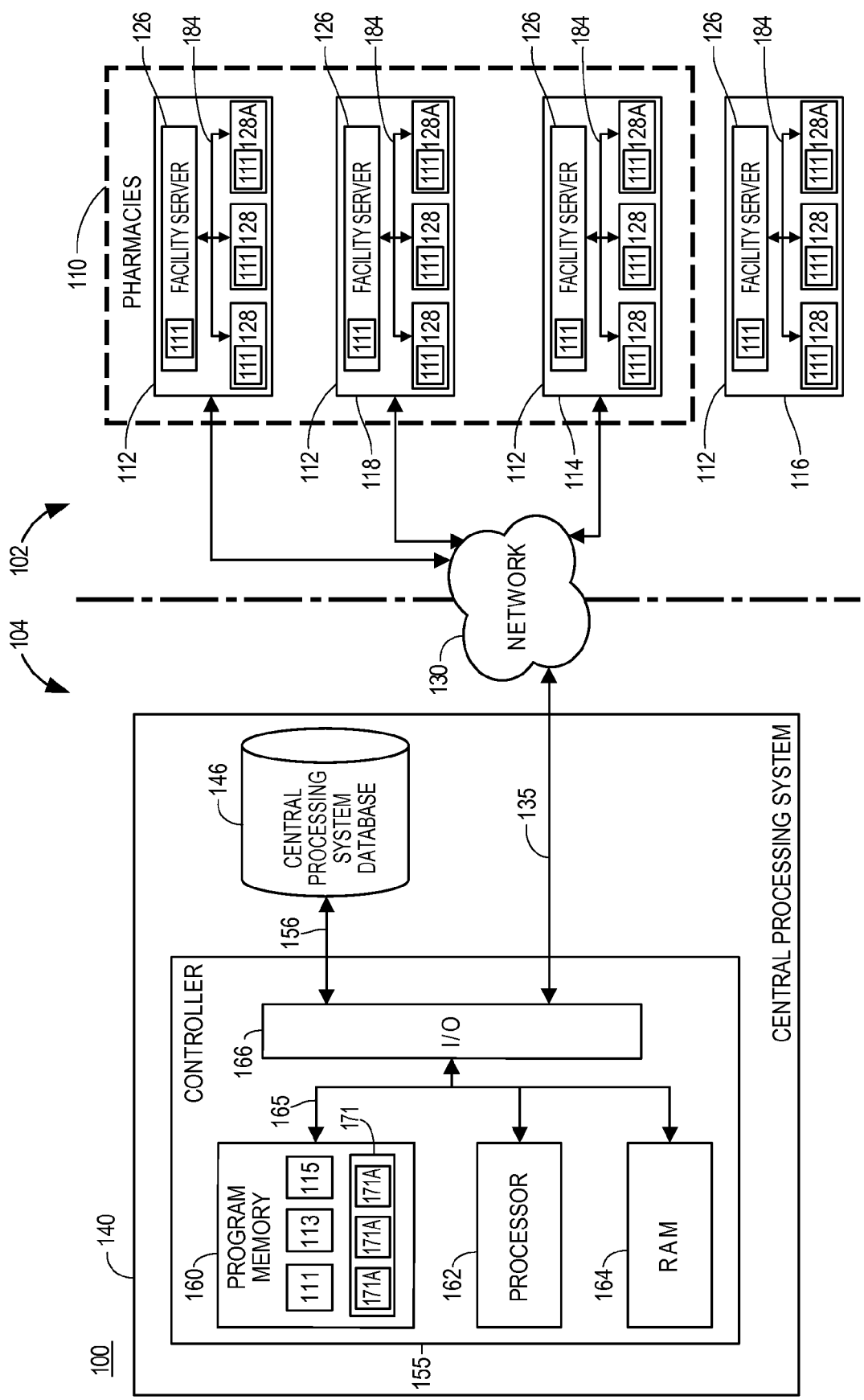
FIG. 1A illustrates a block diagram of a computer network and system on which an exemplary prescription alignment system may operate in accordance with the described embodiments.
Figure 1B:
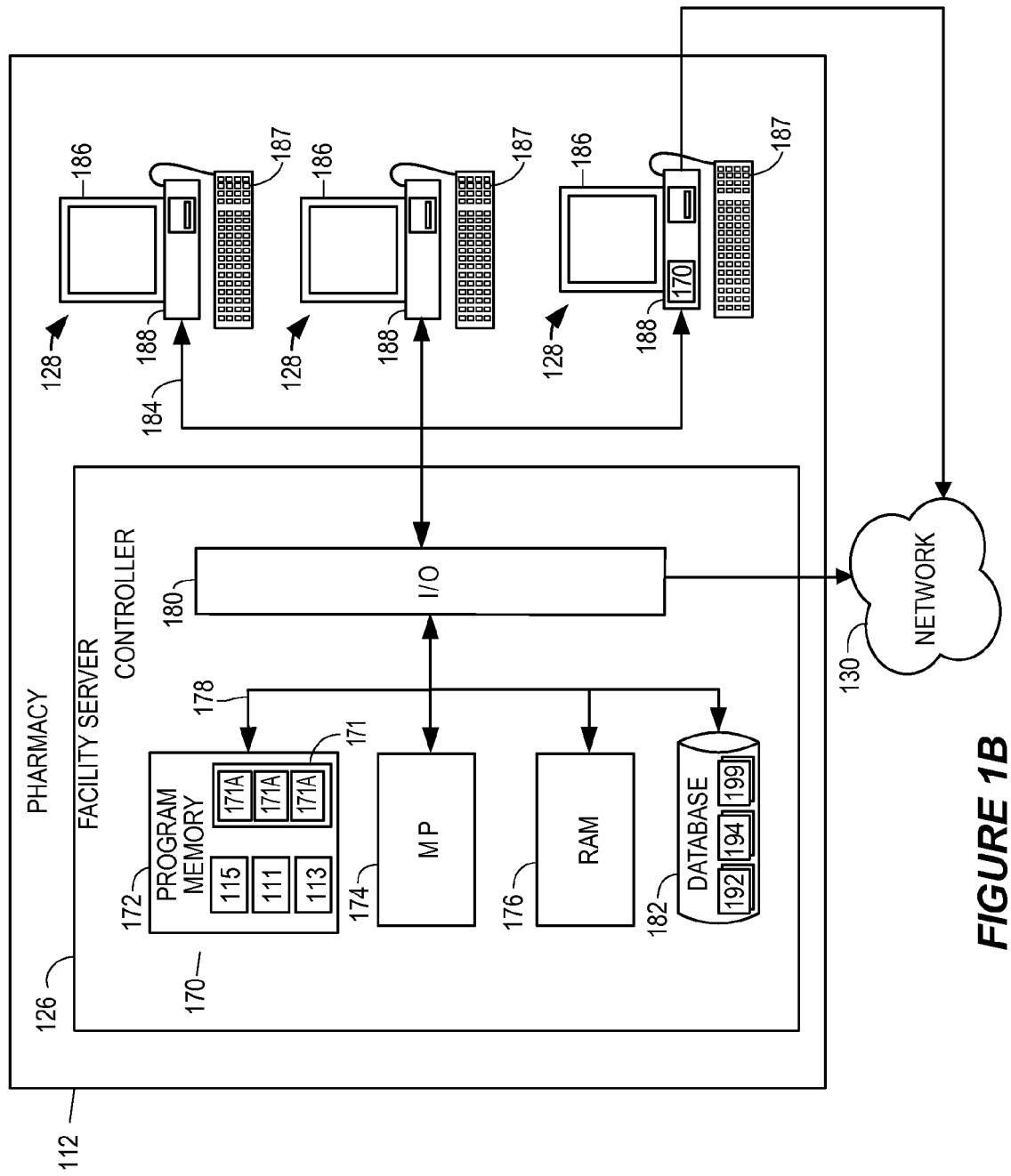
FIG. 1B illustrates a block diagram of a computer server and computer terminals on which an exemplary prescription alignment system may operate in accordance with the described embodiments.
Figure 1C:
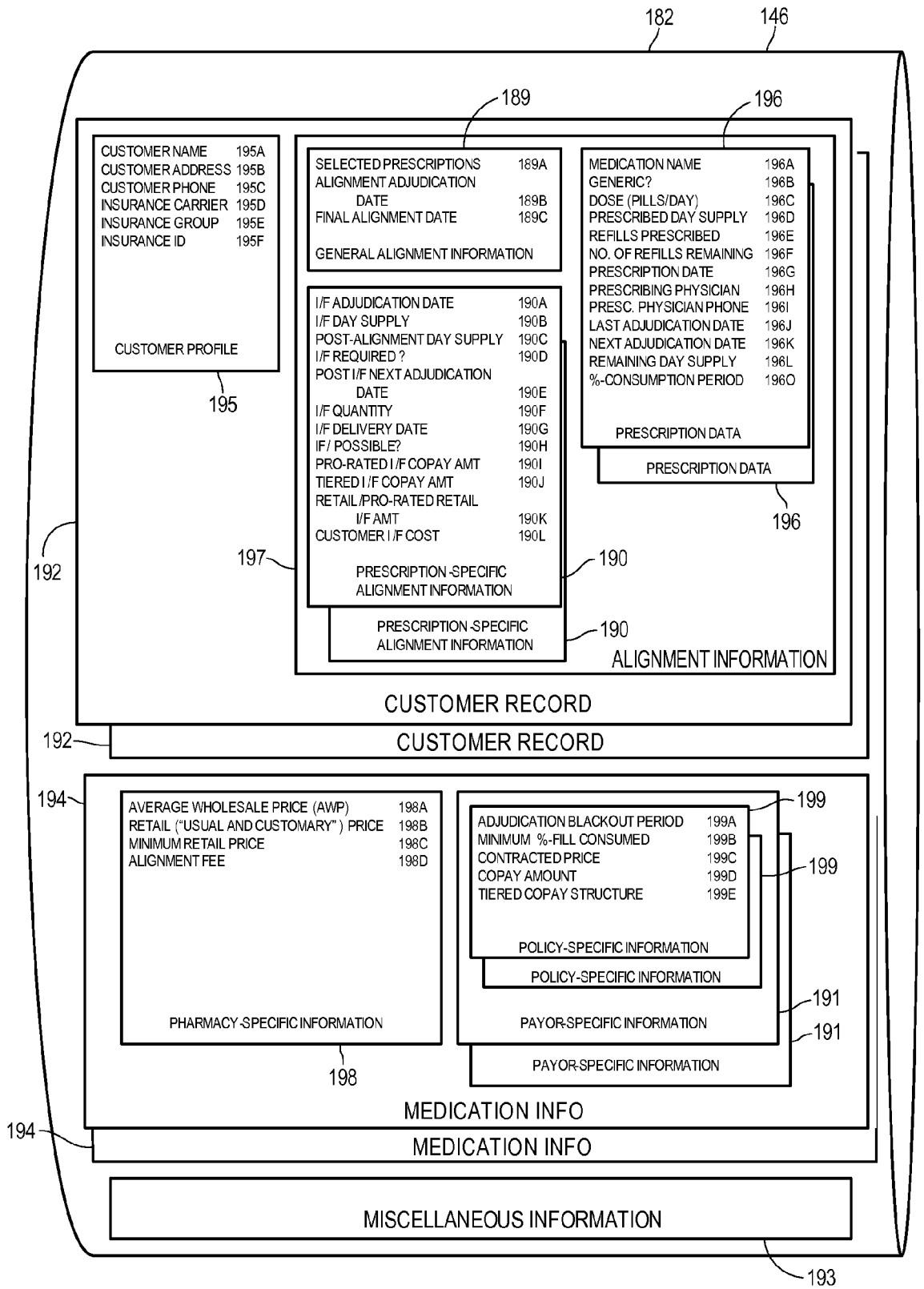
FIG. 1C depicts exemplary data in a database depicted in either of FIG. 1A or FIG. 1B, in accordance with the described embodiments.

FIGS. 1A, 1B, and 1C illustrate various aspects of an exemplary architecture implementing an exemplary prescription alignment system 100. In particular, FIG. 1A illustrates a block diagram of the exemplary prescription alignment system 100. The high-level architecture includes both hardware and software applications, as well as various data communications channels for communicating data between the various hardware and software components. The prescription alignment system 100 may be roughly divided into front-end components 102 and back-end components 104. The front-end components 102 are primarily disposed within a retail network 110 including one or more pharmacies 112 associated with a single company. The pharmacies 112 may be located, by way of example rather than limitation, in separate geographic locations from each other, including different areas of the same city, different cities, or even different states. The front-end components 102 comprise a number of pharmacy workstations 128. The pharmacy workstations 128 are local computers located in the various pharmacies 112 throughout the retail network 110 and executing various pharmacy management-related applications. Pharmacists and other pharmacy personnel, referred to collectively herein simply as "pharmacists" (not shown), use the pharmacy workstations 128 to access customer information, enter new prescriptions, access insurance and payment information, determine the costs (to the customer) of the medications, submit insurance claims, and so forth. Each of the pharmacies 112 may be, for example, an in-store retail pharmacy, an on-line pharmacy, a mail-order pharmacy, a long-term care pharmacy, a workplace/on-site pharmacy, or a specialty pharmacy. Retail network 110 may also include one or more warehouses or central-filling facilities 118, which may be owned by or otherwise affiliated with (e.g., by contract) a pharmacy company. The warehouses or central-filling facilities 118 may distribute medications to the various retail pharmacies 112 in the retail network 110, or may distribute medications directly to customers. Of course, the pharmacy 112 may also be a stand-alone pharmacy 116 (i.e., not part of any retail network or chain).

As used herein, the term medication may be read to mean any substance that may be distributed by a pharmacy or by a pharmacist, including those substances that may be obtained without a prescription (i.e., "over the counter" substances, such as vitamins). Thus, while the embodiments described herein contemplate the alignment of refills related to prescription medications, other substances (e.g., nutritional supplements, over-the-counter medications, etc.) may also be dispensed with one or more prescription medications. The refill of these other substances may likewise be aligned with one or more prescription medications. Of course, the methods described herein may also be used to align refills of two or more non-prescription substances with each other, even if none of the two or more non-prescription substances is aligned with a prescription medication.

Returning now to FIG. 1A, those of ordinary skill in the art will recognize that the front-end components 102 could also comprise a plurality of facility servers 126 and client device terminals 128A disposed at the plurality of pharmacies 112, instead of, or in addition to, a plurality of pharmacy workstations 128. Each of the pharmacies 112 may include one or more facility servers 126 that may facilitate communications between the client device terminals 128A and the back-end components 104 via a digital network 130, described below, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 also refers to the facility servers 126 and the client device terminals 128A, and vice versa. Moreover, environments other than the pharmacies 112, such as the kiosks, call centers, and Internet interface terminals contemplated in U.S. patent application Ser. No. 11/781,926, entitled "System and Method of Prescription Alignment," filed Jul. 23, 2007, may employ the workstations 128, the client device terminals 128A, and the servers 126. As used herein, the term "pharmacy" refers to any of these points of contact (e.g., call centers, kiosks, Internet interface terminals, etc.) in addition to the retail pharmacies 112, warehouses 116, etc. described above.

The front-end components 102 communicate with the back-end components 104 via the digital network 130. The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. The back-end components 104 include a prescription central processing system 140. The prescription central processing system 140 may include one or more computer processors 162 adapted and configured to execute various software applications and components of the prescription alignment system 100, in addition to other software applications, such as a medication management system. The central processing system 140 further includes a database 146. The database 146 is adapted to store data related to the operation of the pharmacies 112 and the prescription alignment system 100. The central processing system 140 may access data stored in the database 146 when executing various functions and tasks associated with the operation of the prescription alignment system 100.

Although the prescription alignment system 100 is shown to include one prescription central processing system 140 and four pharmacies 112, it should be understood that different numbers of computers and pharmacies may be utilized. For example, the digital network 130 may interconnect the system 100 to a plurality of included central processing systems 140 and hundreds of included pharmacies 112 within the retail network 110. According to the disclosed example, this configuration may provide several advantages, such as, for example, enabling near real-time uploads and downloads of information as well as periodic uploads and downloads of information. This provides for a primary backup of all the information generated in the process of updating and accumulating pharmacy data. Alternatively, some of the pharmacies 112, such as the pharmacy 116, may be separate from the digital network 130, storing the necessary data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

FIG. 1B depicts one possible embodiment of the front-end components 102 located in one or more of the pharmacies 112 from FIG. 1A. Although the following description addresses the design of the pharmacies 112, it should be understood that the design of one or more of the pharmacies 112 may be different than the design of others of the pharmacies 112. Also, each of the pharmacies 112 may have various different structures and methods of operation. It should also be understood that while the embodiment shown in FIG. 1B illustrates some of the components and data connections that may be present in a pharmacy 112, it does not illustrate all of the data connections that may be present in a pharmacy 112. For exemplary purposes, one design of a pharmacy is described below, but it should be understood that numerous other designs may be utilized.

Each of the pharmacies 112 has one or more pharmacy workstations 128 and/or a facility server 126. The digital network 184 operatively connects the facility server 126 to the plurality of workstations 128 and/or to the client device terminals 128A. The digital network 184 may be a wide area network (WAN), a local area network (LAN), or any other type of digital network readily known to those persons skilled in the art. The digital network 130 may operatively connect the facility server 126, the workstations 128, and/or the client device terminals 128A to the central processing system 140.

Each workstation 128, client device terminal 128A, or facility server 126 includes a controller 170. Similar to the controller 155 from FIG. 1A, the controller 170 includes a program memory 172, a microcontroller or a microprocessor (MP) 174, a random-access memory (RAM) 176, and an input/output (I/O) circuit 180, all of which are interconnected via an address/data bus 178. In some embodiments, the controller 170 may also include, or otherwise be communicatively connected to, a database 182. The database 182 (and/or the database 146 of FIG. 1A) includes data such as customer records 192, medication information records 194, and miscellaneous information 193 (as depicted in FIG. 1C). As discussed with reference to the controller 155, it should be appreciated that although FIG. 1B depicts only one microprocessor 174, the controller 170 may include multiple microprocessors 174. Similarly, the memory of the controller 170 may include multiple RAMs 176 and multiple program memories 172. Although the figure depicts the I/O circuit 180 as a single block, the I/O circuit 180 may include a number of different types of I/O circuits. The controller 170 may implement the RAM(s) 176 and the program memories 172 as semiconductor memories, magnetically readable memories, and/or optically readable memories, for example.

Either or both of the program memories 160 and 172 may store an alignment engine 171, for execution within the processors 162 and 174, respectively. The alignment engine 171 may perform the various tasks associated with an alignment method, and may be a single module 171A or a plurality of modules 171A. By way of example and not limitation, the alignment engine 171 or the modules 171A within the alignment engine 171 may: receive a selection of a plurality of prescriptions to align; determine a latest adjudication date from a plurality of calculated adjudication dates; calculate parameters associated with an intermediate fill of a prescription, such as an intermediate fill day supply, an intermediate fill quantity, or an intermediate fill delivery date; calculate a final alignment date for a plurality of prescriptions; retrieve information from the database 182 (or the database 146); calculate a parameter, such as a percent-consumption period, required to determine compliance with a rule determined by a third-party payor or a regulatory agency; calculate adjudication dates associated with one or more prescriptions; adjudicate one or more prescriptions; fill prescriptions; cause prescriptions to be shipped to the customer or to a retail location; etc.

The front end components 102 and/or the back-end components 104 may also implement a cost determination module 115, that may be stored in the program memory 160 (or the program memory 172). The cost determination module 115 determines, for each customer, the cost of aligning a plurality of selected prescriptions. The cost determination module 115 is described in greater detail below.

In addition to the controller 170, the workstations 128 and the client device terminals 128A may further include a display 186 and a keyboard 187 as well as a variety of other input/output devices (not shown) such as a scanner, printer, mouse, touch screen, track pad, track ball, isopoint, voice recognition system, digital camera, etc. A pharmacy employee may sign on and occupy each workstation 128 or client device terminal 128A to assist the pharmacy employee in performing his or her duties. Pharmacy employees may sign onto the workstation 128 or the client device terminal 128A using any available technique, such as entering a user name and password. If a pharmacy employee signs on to the system using a client device terminal 128A, the network 184 communicates this information to the facility server 126, so that the controller 170 may identify which pharmacy employees are signed onto the system 100 and which workstation 128 or client device terminal 128A the employee is signed onto. This may be useful for record keeping and/or monitoring the pharmacy employees' productivity as well as in record-keeping.

Various software applications resident in the front-end components 102 and the back-end components 104 implement the prescription alignment and cost-determination methods, and provide various user interface means to allow users (i.e., pharmacists and/or customers) to access the system 100. One or more of the front-end components 102 and/or the back-end components 104 may include a user-interface application 111 for allowing a user, such as the pharmacist or customer service representative, to input and view data associated with the system 100. In some embodiments, the user-interface application 111 is a web browser client, and the facility server 126 or the central-processing system 140 implements a server application 113 for providing data to the user-interface application 111. However, the user-interface application 111 may be any type of interface, including a proprietary interface, and may communicate with the facility server 126 or the central processing system 140 using any type of protocol including, but not limited to, file transfer protocol (FTP), telnet, hypertext-transfer protocol (HTTP), etc. Moreover, the user interface application 111 may be running on one of the workstations 128 in a pharmacy 112 (as when the pharmacist is accessing the system) or may be running on an Internet interface terminal (not shown) (as when a customer is requesting and configuring alignment of the customer's prescriptions). The information sent to the workstations 128 and to the client device terminals 128A from the facility server 126 and/or the central processing system 140 includes data retrieved from the database 146 and/or the database 182. The central processing system 140 and/or the facility server 126 may implement any known protocol compatible with the user-interface application 111 running on the workstations 128 and the client device terminals 128A and adapted to the purpose of receiving and providing the necessary customer information via the digital network 130 and/or the digital network 184.

For purposes of implementing the prescription alignment system 100, the primary point of contact with the customer is through the pharmacy 112. As used herein, the term "customer" may be, by way of example, a patient (i.e., the person named on the prescription), a guardian (e.g., the parent of a child named on the prescription), a care-giver (i.e., anyone who takes care of a patient or picks up the medication on the patient's behalf), etc. Moreover, the term "customer" is not limited to a single person, but may instead be any person or persons having a reason to align a group of prescriptions. For example, a customer could be a care-giver responsible for various patients, for which caregiver it would be convenient to align prescriptions for the various patients so as to avoid having to order and/or retrieve prescription refills on an overwhelming number of dates. Or, for example, a customer could be a family wherein multiple family members have prescriptions which, if aligned, would reduce the burden of ordering and/or retrieving the various medications prescribed to the family members. In any event, while the term "customer" is used interchangeably with the term "patient," in this specification the term "customer" is used primarily so as to avoid confusion. Thus, a customer may be a patient (as where a person picks up his/her own prescriptions), but a customer may also be, by way of example, a parent picking up a prescription for a child (i.e., a guardian), a husband picking up a prescription for his wife, a home-care nurse picking up a prescription for one or more patients, a care facility director (or other personnel) picking up prescriptions for one or more patients, etc. Also, as mentioned above, the pharmacy 112 may be any of the channels through which the entity implementing the prescription alignment system 100 serves its pharmacy customers. Thus, the pharmacy 112 may be a retail pharmacy 112 in the customer's neighborhood (or any other drug store in a drug store chain), an on-line pharmacy or an on-line interface to a pharmacy 112 or to a retail network 110 (where the customer uses a web-browser to communicate with the server application 113), a phone/touchtone interface to a pharmacy 112 or to a retail network 110 (where the customer uses a phone service to communicate with the server application 113), a mail-order pharmacy, a central-filling facility, a specialty pharmacy, or any other type of pharmacy affiliated with the entity implementing the prescription alignment system 100. In some embodiments, a pharmacist, other pharmacy staff, or a customer service representative (all referred to herein simply as "the pharmacist") invokes the prescription alignment system 100 while interacting with a customer at a pharmacy 112 or over the telephone (e.g., from a retail pharmacy 112, or a call center). The pharmacist will have access to one of the pharmacy workstations 128 or to one of the client device terminals 128A and may invoke the prescription alignment system 100 when he or she fills the customer's prescription. In another embodiment, the customer invokes the prescription system 100 (e.g., at a kiosk, via an Internet interface terminal, on a mail-in form, etc.). Alternatively, the prescription alignment system 100 may be invoked automatically for each new prescription entered (e.g., by reminding the pharmacist to ask whether the customer would like to align his or her prescriptions) or by a broader system, such as a medication management system.

As described above, one or both of the databases 146 and 182, illustrated in FIGS. 1A and 1B, respectively, include various information about the pharmacy's customers and the prescriptions filled by the pharmacy, as well as various business information including, but not limited to, information associated with third-party payors (e.g., insurance companies), employee information, and the like. FIG. 1C depicts some of the exemplary data that the system 100 may store on the databases 146 and 182. The databases 146 and/or 182 contain a customer record 192 for every customer who purchases his/her medication at one of the pharmacies 112 (or via a call center, website, etc.). The customer record 192 contains important information about the customer and the various pharmacy services that have been invoked by, or on behalf of, the customer in a customer profile 195. The customer profile 195 includes basic biographical information about the customer, such as a customer name 195A, a customer address 195B, a customer phone number 195C, an insurance carrier 195D associated with the customer, an insurance group number 195E for the customer, an insurance ID number 195F for the customer, etc. Additionally, the customer profile 195 may include other information such as credit card information or other payment information, one or more customer e-mail addresses, user name and/or password information, online security question/answer information, etc. Of course, the customer profile 195 may also include other or less information than that described, such as, for example, multiple insurance carriers 195D, multiple group numbers 195E, and multiple insurance ID numbers 195F.

The customer record 192 also includes prescription data 196 for each prescription filled by the pharmacy for the customer. The prescription data 196 generally include, but are not limited to: a name 196A of the medication; an indication 196B whether a generic may be substituted; a dose (i.e., pills per day) 196C of the medication; a number of days of medication to be dispensed (also referred to herein as a "day supply" or a "prescribed day supply") 196D; a number of refills prescribed 196E; a number of refills remaining 196F; a prescription date 196G; a prescribing physician 196H; a phone number 196I for the prescribing physician; a date on which the prescription was most recently adjudicated (also referred to herein as a "last adjudication date") 196J; a calculated date on which the prescription may next be adjudicated (also referred to herein as a "next adjudication date") 196K for the prescription; a remaining day supply 196L for the prescription; and a percent-consumption period 196O indicating the number of days it would take to consume the required minimum percent-fill consumed of the fill for the prescription). Of course, the prescription data 196 need not include all of the information above, such as when the system 100 determines some information (e.g., the next adjudication date 196K) but does not store it, or stores it some place other than with the prescription data 196 in the database 146 or the database 182. Moreover, the prescription data 196 may include additional information not mentioned above.

Additionally, the customer record 192 includes alignment information 197. The alignment information 197 generally includes information related to the final alignment of the prescriptions, including, in part, general alignment information 189, which may include, for example, a list of prescriptions selected for alignment 189A, an alignment adjudication date 189B, and a final alignment date 189C. Additionally, the alignment information 197 includes prescription-specific alignment information 190 for each of the prescriptions selected for alignment. For example, aligning the plurality of selected prescriptions may require adjusting the day supply for one fill for each of one or more of the selected prescriptions by, for example, dispensing more of the medication ("overfilling" or "long-filling") or less of the medication ("underfilling" or "short-filling") such that the customer exhausts the supply of a first medication at the same time as the supply of a second medication. An underfilled prescription is referred to herein as a "short fill," an overfilled prescription is referred to herein as a "long fill," and short fills and long fills are referred to herein collectively as "intermediate fills" (i.e., each is a fill between the last fill and the alignment fill). Each short fill or long fill results from a "refill adjustment" and, therefore, may also be referred to as an "adjusted fill" or an "adjusted refill." Each intermediate fill may have an associated intermediate-fill adjudication date 190A, an associated intermediate-fill day supply 190B, indicating the number of days of medication dispensed, etc. The information 190 may also include, for each prescription, a post-alignment day supply 190C (indicating for the medication the day supply to be dispensed on or around the alignment adjudication date and, presumably, for each refill thereafter), an indication 190D of whether the prescription requires a intermediate-fill, the post intermediate-fill next adjudication date 190E, an intermediate-fill quantity 190F, an intermediate-fill delivery date 190G, an indication 190H of whether an intermediate fill is possible, a pro-rated co-pay amount 190I for the intermediate-fill, a tiered copay amount 190J for the intermediate fill, a retail cost 190K (which may be a pro-rated retail cost) for the intermediate fill, and a customer cost 190L (i.e., the cost determined by the cost determination module 115) for the intermediate fill. Of course, the alignment information 197, including the information 189 and 190, may, in some embodiments, include more or less information than described above. Additionally, the alignment information 197 may vary over time. For example, when a customer adds a new medication, the alignment information 197, including the final alignment date, may change to accommodate the newly-prescribed medication. Moreover, in some circumstances (e.g., where there are no applicable adjudication rules), it may be possible to deliver all of any required intermediate-fills on the same date and, therefore, the intermediate-fill delivery date 190G for each required short fill could be the same.

A number of parameters relate specifically to the adjudication of the prescription (i.e., making a claim to the insurance company for the particular prescription) or the cost of a prescribed medication. These parameters are typically specific to each medication and, therefore, may be stored in a plurality of medication information records 194. Some of these parameters are specific to each individual third-party payor, and may be specific to each particular policy held by the third-party payor. Information specific to a third-party payor or a policy held by a third-party payor may or may not be available to the pharmacy 112, the retail network 110, the person or persons programming the alignment module 171, and/or the person or persons programming the cost determination module 115. Thus, the information stored on the database 182 or the database 146 may reflect the actual or estimated most restrictive rules and/or parameters, or may reflect the parameters as estimated from previous transactions with the third-party payor (e.g., the payor has rejected past adjudications of a particular medication for a customer before 77% of the medication could be consumed; the customer's copay for past refills has been $15.00, etc.). Alternatively, the modules 171 and 115 (and possible others) may be in communication with one or more databases (not shown) associated with one or more of the third-party payors.

In any event, within each medication information record 194, the database 182 or the database 146 may store a number of payor-specific information records 191, and each payor-specific information record 191 may, in turn, store a number of policy-specific information records 199. Some of the parameters stored in the medication information records 194 relate specifically to how often and when adjudication may occur. For example, one adjudication rule may state that sufficient time should have elapsed after adjudication for the customer to consume some percentage of the prescribed day supply. This "minimum percent-fill consumed" may be stored as a record 199B in the database 182 or the database 146. Thus, for a medication prescribed with a 30-day supply, 23 days must elapse after the adjudication for the prescription if the adjudication rules for the particular insurance company (i.e., the minimum percent-fill consumed 199B) require that sufficient time elapse for the customer to consume 75% of the medication prior to adjudication the prescription again. The minimum percent-fill consumed 199B may vary based on the prescribed medication, the filling pharmacy, the third-party payor, the medical facility, the prescribed day supply, the customer, etc. Alternatively, or additionally, adjudication rules promulgated by a third-party payor may require that a minimum number of days elapse between two adjudications for a particular prescription. This information may be stored in a record 199A in the database 182 or the database 146. Such an "adjudication blackout period" 199A might, for example, require four, five, or even ten days between adjudications of a prescription. Another possible rule, promulgated by either a third-party payor or by a regulatory agency, may limit the amount of a medication (e.g., the number of tablets) dispensed to a customer by the pharmacy in a specific period of time.

Other parameters stored in the medication information records 194 relate to the cost of the prescribed medication. For example, each third-party payor policy (e.g., each policy held by a specific insurance company) may have a contracted price 199C for each medication. Of course, the contracted price 199C for a medication need not be different for each policy held by the third-party payor, but may instead be the same for every policy held by the third-party payor, or for groups of policies held by the third-party payor (e.g., a first contracted price 199C for PPO policies, a second contracted price 199C for HMO policies, etc.). Each third-party payor policy may also have a co-payment amount 199D (also referred to herein as "a copay") (i.e., a portion, paid by the customer, of the cost of the medication) for each medication. The copay amount 199D may be a fixed amount or may be a percentage of the cost of the dispensed medication. Additionally, the copay 199D could be different for each medication or could be the same for each medication, and could vary by policy, by policy type (e.g., HMO, PPO, etc.), or could be the same for every policy held by the third-party payor.

Still others of the parameters stored in the medication information records 194 may relate to the cost of the medication, but are instead independent of any third-party payor. The system 100 may store these parameters in pharmacy-specific information records 198. One such parameter that the system 100 may store in the pharmacy-specific information records 198 is the average wholesale price 198A (AWP) of a medication. The AWP generally refers to the average price at which manufacturers, distributors, and other suppliers sell the medication to physicians, pharmacies, and other customers. Another parameter is the retail price 198B, set by the retail network 110 or the pharmacy 112, at which the retailer sells a particular medication. The retail price 198B for a medication may also be referred to as the "cash price" or the "usual and customary price" for the medication. The retail price 198B may be the same across all pharmacies 112 in a retail network 110, or may vary by pharmacy as a result of, for example, local economic conditions (e.g., cost of real estate, cost of living, etc.). Moreover, each retail network 110 (or each pharmacy 112 in the retail network 110) may have a minimum retail charge 198C for the medication (or for all medications). For example, if the AWP 198A for a medication is $0.50 per pill, and the retail price 198B for a medication is $1.00 per pill, the retail price 198B for five of the pills would be $5.00. However, if the pharmacy 112 has a minimum retail charge 198C for the medication of $10.00, then the customer would pay $10.00 for the pills in quantities less than ten. The pharmacy-specific information records 198 may also in some instances include an alignment fee 198D charged to customers for aligning the prescriptions. Of course, the pharmacy-specific information 198 and/or the payor-specific information 191 need not be organized in the database 182 or the database 146 as described above and, in some cases, may not be stored on the database 182 or the database 146 at all, such as when the data is stored on a remote server (not shown) (e.g., the payor's server) and is retrieved over a network, such as the network 130.

Figure 2:
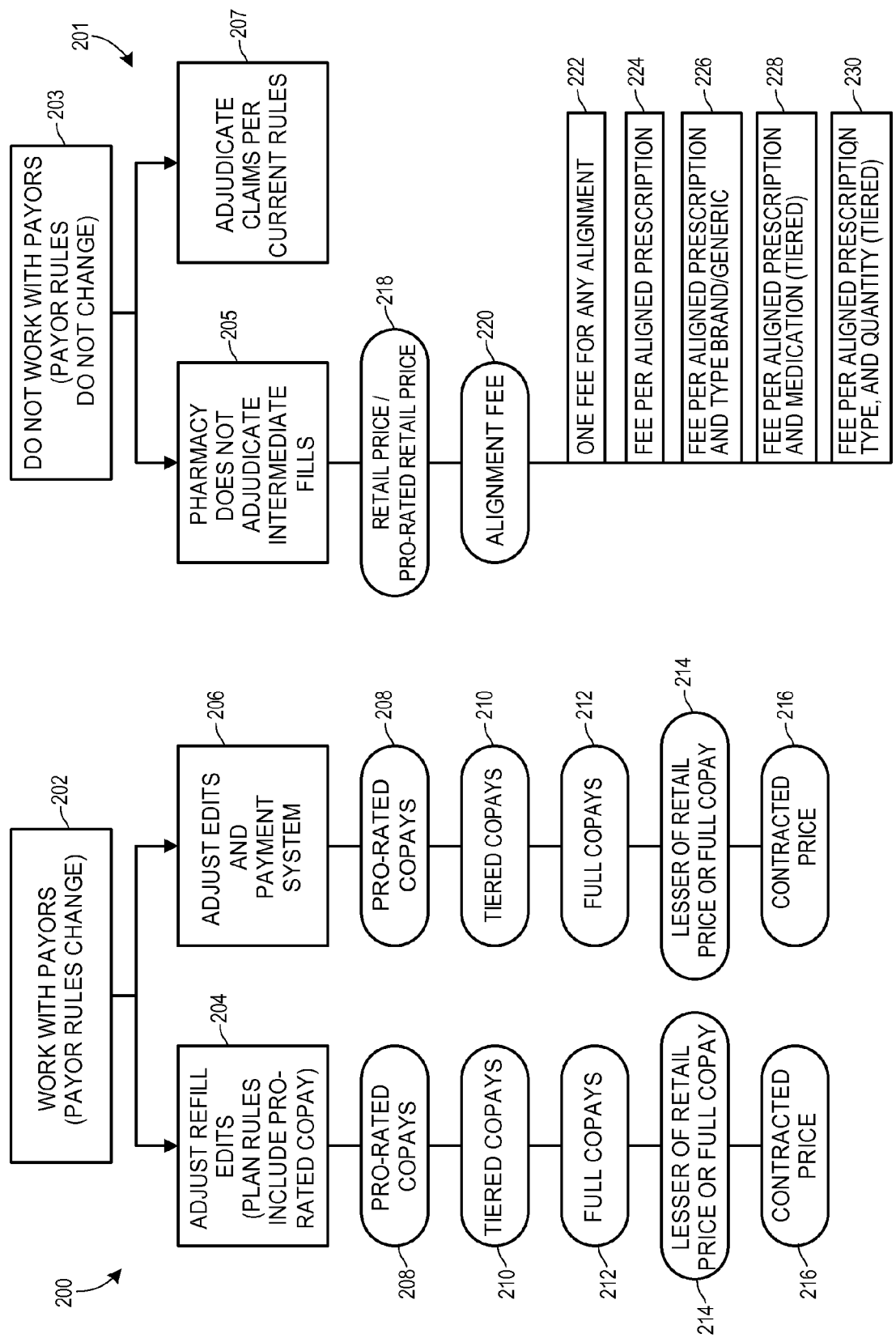
FIG. 2 depicts various options available for charging customers for alignment of prescriptions.

FIG. 2 illustrates some of the various options available to a pharmacy 112 or to a retail chain 110 for charging a customer for long-fills and/or short-fills. While the embodiments below are described with reference to a retail chain 110 of pharmacies 112, each embodiment could also apply to a pharmacy 112 that is not part of a retail network 110. The particular set of options available under given circumstances depends, in part, on the rules set up by the various third-party payors. For example, a given third-party payor may or may not allow short-fills, may or may not allow long-fills, may or may not allow pro-ration of copays, may or may not allow waiver of adjudication rules (e.g., adjudication blackout periods, minimum percent-consumption requirements, etc.) for the purposes of alignment, and may or may not allow adjusted refills. Thus, for the purposes of determining what cost to charge a customer for alignment of prescriptions, the retail network 110 may work within the current third-party payor rules, circumvent the third-party payor rules, or work with the third-party payors to change their rules. A tree 200, illustrated in FIG. 2 and originating with a block 202, illustrates the options available if the retail network 110 works with the third-party payors to change one or more of the third-party payor rules. A tree 201, illustrated in FIG. 2 and originating with a block 203, illustrates the options available if the retail network 110 opts to work within the current rules of the third-party payor or payors or opts to circumvent the third-party payor rules.

Turning first to the tree 200, a block 204 represents a situation wherein the third-party payor's claims system already provides one or more special payment schemes (e.g., pro-rated copays, contracted rate payments, etc.), and the retail network 110 works with the third-party payors to allow refill adjustments. Meanwhile, a block 206 represents a situation wherein the retail network 110 works with the third-party payors to allow refill adjustments and also to adjust the third-party payor claims system to allow one or more special payment schemes, though some third-party payors' claims systems may already be set up to accommodate one or more of the special payment schemes described below. In either situation, however, the options available for charging the customer, depending on the third-party payor's systems and the contract between third-party payor and the retail network 110, may include the same range of alternatives (described below) including, but not limited to, charging a pro-rated copay (block 208), charging one of a range of tiered copays (block 210), charging one or more full copays (block 212), charging a selection of the lesser of the retail price and the full copay (block 214), or charging the contracted price (block 216).

As described above, a copay is a portion, paid by the customer, of the total cost of the dispensed medication. The total cost of the dispensed medication is usually calculated according to the contracted price between the third-party payor and the retail network 110 or the pharmacy 112, though the total cost may be calculated by other methods in some instances. The customer's copay is usually a fixed dollar amount or a fixed percentage of the total cost, and is determined by the contract between the third-party payor and the customer's employer or health plan. If proceeding according to the block 208, the system 100 charges the customer a pro-rated copay amount 190I, based on the percentage of the prescribed day supply 196D of medication actually dispensed. To do so, the cost determination module 115 may retrieve from the database 182 or the database 146 the copay amount 199D for the medication. While the database 182 or the database 146 may store the copay amount 199D in a record associated with both the particular medication and particular third-party payor, or associated with both the particular medication and a particular policy, policy type, or group of policies associated with the particular third-party payor, the copay amount 199D may also be stored (and retrieved) according to other organization schemes, or may be retrieved from another source via the network 130. The cost determination module 115 may also retrieve the prescribed day supply 196D for the medication, and the intermediate fill day supply 190B, calculated by the alignment engine 171. The cost determination module 115 calculates the percentage of the prescribed day supply 196D represented by the intermediate fill day supply 190B and multiplies the copay amount 199D by the same percentage. For example, if a customer's copay amount 199D for a 30-day supply of the medication is $15.00, and the alignment engine 171 calculates the intermediate fill day supply 190B to be 10 days (a short fill), the pro-rated copay amount 190I would be $5.00. Likewise, if, in the example above, the alignment engine 171 calculates the intermediate fill day supply 190B to be 40 days (a long fill), the pro-rated copay amount 190I would be $20.00. Of course, the cost determination module 115 could also treat the long fill as a full fill (30 day supply) and a short fill (10 day supply). The cost determination module 115 would, presumably, calculate the same cost, but this would likely require two adjudications of the medication and, therefore, may be less desirable.

A tiered copay is a similar concept. Instead of the customer's copay being directly proportional to the amount of medication dispensed in an intermediate fill (as in a pro-rated copay), the customer's copay amount is one of several amounts, depending on the range into which an intermediate fill day supply 190B of the medication falls. If proceeding according to the block 210, the system 100 charges the customer a tiered copay amount 190J, based on the range into which the intermediate fill day supply 190B falls. To do so, the cost determination module 115 may retrieve from the database 182 or the database 146 a copay tier structure 199E for the medication. While the database 182 or the database 146 may store the copay tier structure 199E in a record or records associated with both the particular medication and particular third-party payor, or associated with both the particular medication and a particular policy, policy type, or group of policies associated with the particular third-party payor, the copay tier structure 199E may also be stored (and retrieved) according to other organization schemes. The cost determination module 115 may also retrieve the prescribed day supply 196D for the medication and/or the intermediate fill day supply 190B, calculated by the alignment engine 171. The cost determination module 115 may then compare the intermediate fill day supply 190B to the copay tier structure 199E to determine the customer's tiered copay amount 190J. For example, the copay tier structure 199E may provide that for 1-10 days supply, the customer's tiered copay amount 190J is $5.00, for 11-20 days supply, the customer's tiered copay amount 190J is $10.00, and for 21-30 days supply, the customer's tiered copay amount 190J is $15.00. If the cost determination module 115 compares the alignment engine 171 calculates the intermediate fill day supply 190B to be 12 days, to the copay tier structure 199E indicates that the customer's tiered copay amount 190J would be $10.00. It should be understood that the tiered copay structure 199E may be inclusive of long fills in addition to short fills, providing copay tiers greater than the prescribed day supply 196D as well as less than the prescribed day supply 196D.

Of course, the retail network 110 or the pharmacy 112, in coordination with the third-party payor(s), could also forgo pro-rated copay amounts and, instead, only charge customers the copay amount 199D or intervals thereof (block 210). This could include charging the customer the copay amount 199D for a short fill, charging the customer the copay amount 199D for any intermediate fill (regardless of whether the intermediate fill is a short fill or a long fill), or even treating a long fill as one or more full fills and a short fill, and charging the customer the copay amount 199D for each full fill or portion thereof. For example, in some embodiments, if the copay amount 199D for a 30-day supply of a medication is $10.00, the cost determination module 115 may determine that the customer cost 190L is $10.00 for any intermediate fill day supply 190B up to a 30-day supply. In another embodiment, the cost determination module 115 may determine that the customer cost 190L is $10.00 for any intermediate fill day supply 190B up to a 60-day (or more) supply. In yet another embodiment, the cost determination module 115 may determine that the customer cost 190L is $10.00 for any intermediate fill day supply 190B up to a 30-day supply, $20.00 for any intermediate fill day supply 190B up to a 60-day supply, $30.00 for any intermediate fill day supply 190B up to a 90-day supply, etc.

In some embodiments, the cost determination module 115 may be programmed to charge the customer the lesser of the retail price 198B and the full copay amount 199D (block 214). In doing so, the cost determination module 115 may retrieve from the database 182 or the database 146 the retail price 198B of the medication, the intermediate fill day supply 190B calculated by the alignment engine 171, and the copay amount 199D. The cost determination module 115 may then compare retail price 190K of the intermediate fill (i.e., the retail price 198B times the quantity of medication indicated by the intermediate fill day supply 190B) to the copay amount 199D, to determine which option is most cost-efficient for the customer. For example, if the retail price 198B is $1.00 per day supply (e.g., $1.00 per pill for a once/day prescription) and the alignment engine 171 determines that the intermediate fill day supply 190B for that prescription is 15 days, the cost determination module 115 may indicate that customer cost 190L is $15.00 if the copay amount 199D is $25.00, but may indicate that the customer cost 190L is $10.00 if the copay amount 199D is $10.00.

Another option that the cost determination module 115 may employ is to charge the customer the contracted price 199C for the medication (block 216). The cost determination module 115 may, in this case, retrieve from the database 182 or the database 146 the contracted price 199C for the medication and the intermediate fill day supply 190B calculated by the alignment engine 171, and may determine the customer cost 190L of the medication dispensed in accordance with the calculations of the alignment engine 171 by multiplying the quantity of the medication by the contracted price 199C.

Of course, the various options described above with respect to the blocks 208-216 are not mutually exclusive, and could be combined in any number of ways based on any number of criteria including, but not limited to: whether the intermediate fill is a short fill or a long fill; whether the dispensed medication is a brand name medication or a generic medication; the quantity of medication dispensed; the particular medication being dispensed, etc. For example, the cost determination module 115 could apply a pro-rated copay amount 190I for short fills, and a tiered copay structure 199E for long fills. Alternatively, the cost determination module 115 may determine that a customer should pay the full copay amount 199D for any short fill of a first particular medication and two full copay amounts 199D for any long fill of the particular medication, but may determine that the customer should pay the retail price 190K for either a short fill or a long fill of a second particular medication.

The various options associated with the tree 200 all require one or more third-party payors to make changes to their claims systems (from current systems) to accommodate refill adjustments, waiver of adjudication rules, and/or alternate payment schemes such as pro-rated copays. However, in some cases, third-party payors may be unwilling to make changes to accommodate these changes, or the retail network 110 or the pharmacy 112 may not wish to engage in the considerable expense, time commitment, and/or delay that implementing such changes could entail. In such instances, whether applicable only to a sub-set of third-party payors or across the range of third-party payors, the retail network 110 could forego the payor rule changes.

Referring still to FIG. 2, the tree 201 illustrates options available if the retail network 110 chooses not to work with the payors to make the changes, or if one or more of the payors cannot otherwise accommodate refill adjustments and/or alternative payment schemes. One option is to provide the intermediate fills to the customer in accordance with the calculations of the alignment engine 171, without adjudicating the intermediate fills (i.e., without submitting a claim to the third-party payor) (block 205). Another option is to adjudicate the refills required for alignment as possible according to each payor's claims system and the calculations and/or determinations of the alignment engine 171 (block 207).

One of the options available when not adjudicating intermediate fills (i.e block 205) is that the retail network 110 may charge the customer the retail price 190K for the dispensed medication (block 218). For example, suppose a pharmacy 112 implements a minimum retail price 198C of $10.00 for Medication A, that the retail price 198B for Medication A is $1.00 per pill (1 pill/day), that a customer is associated with a third-party payor that cannot accommodate short fills or long fills, and that the alignment engine 171 calculates that the customer requires an intermediate fill day supply 190B of 12 pills of Medication A. The cost determination module 115, operating in accordance with the payment scheme of block 218, would retrieve from the database 182 or the database 146 the retail price 198B of Medication A, the minimum retail price 198C for Medication A, and the intermediate fill day supply 190B of Medication A calculated by the alignment engine 171. The cost determination module 115 determines, by multiplying the retail price 198B of Medication A by the quantity of medication dispensed (i.e., the intermediate fill day supply 190B multiplied by the number of pills per day), that the retail cost 190K of the intermediate fill of Medication A comes to $12.00. The cost determination module 115 compares the retail cost 190K of the intermediate fill to the minimum retail price 198C, and determines that the customer should pay the retail cost—$12.00. However, in the example above, if the retail price 198C for Medication A were $0.50 per pill, the cost determination module 115 would calculate the retail cost of the intermediate fill as $6.00 and, comparing the retail cost of the intermediate fill to the minimum retail price 198C, would determine that the customer should pay the minimum retail price 198C—$10.00. Of course, the minimum retail charge 198C could be the same at every pharmacy 112 in a retail network 110, or could vary among the various pharmacies 112 in the retail network 110 according to, for example, labor costs, property costs, and the like.

Of course, in instances where the retail network 110 implements a minimum retail price 198C, and the retail cost 190K of medication dispensed in the intermediate fill is less than that minimum retail price 198C, the minimum retail price 198C could be pro-rated (block 218). For example, if the minimum retail price 198C applies for a full fill of a medication, the minimum retail price 198C is $10.00, and the alignment engine 171 calculates that an intermediate fill day supply 190B of 15 days is required (i.e., one-half of a normal 30-day supply for the medication), the cost determination module 115 may determine that the customer cost 190L is $5.00 for the intermediate fill (i.e., one-half of the minimum retail charge 198C).

An alternative option available if the pharmacy 112 or the retail network 110 chooses not to work with the payors to make the changes, or if one or more of the payors cannot otherwise accommodate refill adjustments and/or alternative payment schemes, is to charge the customer an alignment fee 198D (block 220) and not adjudicate the prescription, instead of charging the customers directly for the various intermediate fills. Of course, the alignment fee 198D may reflect any number of variables. For example, the retail network 110 may charge a set fee for alignment of any number of medications (block 222), regardless of how many prescriptions, whether the medications are generic or brand name, the intermediate fill day supply 190B of the aligned medications dispensed, or the price of the medication (e.g., AWP, retail price, contracted price, etc.), which fee may reflect the average cost of alignment across all customers.

The pharmacy 112 or the retail network 110 may alternatively charge the customer a set fee for each prescription brought into alignment (block 224). The alignment fee 198D may reflect the average cost of bringing a single medication into an alignment (i.e., the average cost of an intermediate fill, across all medications). Thus, if the alignment fee 198D is $10.00 per prescription, a customer aligning three prescriptions would pay $30.00, while a customer aligning eight prescriptions would pay $80.00. This payment scheme is more likely to result, in the long run, in a closer balance between the cost of the medication dispensed and the income of the retail network 110. However, for customers with many prescriptions, this payment scheme could be prohibitively expensive and there are instances in which a customer could pay significantly more than it cost the retail network 110 to align the prescriptions (e.g., when a customer has many medications but they are all generic and require only small intermediate fills/short fills).

As yet another alternative, the retail network 110 may charge a first fee for aligning any prescription for a brand name medication and a second fee for aligning any prescription for a generic medication (block 226). This payment scheme is more likely still to result in equitable distribution of costs between customers, regardless of whether the customers have many prescriptions or few, and regardless of whether the prescriptions are for generic or brand name medications. For example, if the average cost of intermediate fills for generic medications is $5.00 and the average cost of intermediate fills for brand name medications is $15.00, the alignment fee 198D for each could be set accordingly. Thus, a customer aligning two prescriptions for generic medications would pay $10.00 for alignment, a customer aligning two prescriptions for brand name medications would pay $30.00, a customer aligning one prescription for a brand name medication with one prescription for a generic medication would pay $20.00, etc. Of course, the respective alignment fees 198D need not reflect the average costs for generic and brand name medications. Brand name medications are often significantly more expensive than generic medications and could be prohibitively so, resulting in customers choosing to forego alignment (and other services requiring alignment, such as special packaging programs, etc.) instead of paying a high cost for alignment. To prevent this, the retail network 110 could inflate the alignment fee 198D charged for alignment of prescriptions for generic medications, while decreasing the alignment fee 198D charged for alignment of prescriptions for brand name medications.

The quantization of the alignment fee 198D can be further narrowed by specific medication (i.e., by charging an alignment fee 198D for each medication reflecting the average cost of intermediate fills for that medication) (block 228) or by quantity dispensed in an intermediate fill (block 230) and, preferably, in tiered quantities (e.g., a first price for intermediate fills of 1-10, a second price for intermediate fills of 11-20, etc.). Further, the various options for determining the alignment fees 198D may be combined. For example, the alignment fee 198D may be based solely on the total quantity of medication dispensed in intermediate fills across all prescriptions (or one of a number of ranges into which that total quantity falls), or may be charged per prescription based on the quantity of medication dispensed in each intermediate fill (or one of a number of ranges into which each intermediate fill quantity falls).

While the embodiments above are described with reference to a single third-party payor (i.e., a single insurance company), it may also be possible to consider multiple third-party payors in some embodiments and, in doing so, adjudicate the claims in a manner that is optimal for the customer (i.e., in a manner that is least costly for the customer). It should be noted, however, that this may not be possible in all instances where there are multiple third-party payors. For example, a first third-party payor may be designated as providing primary coverage, while a second third-party payor may be designated as providing secondary coverage.

Further, while the embodiments described above assume, for the most part, that all of the information is available to the pharmacy 112 or the retail network 110 (i.e., assumes transparency of adjudication rules and payment information from the payors), in some instances some or all of this information may be unavailable to the pharmacy 112 or the retail network 110. For example, in some embodiments, it may only be possible to determine the amount of a copay, the amount of a pro-rated copay, or the amount of a tiered copay by adjudicating the prescription (i.e., the pharmacy 112 sends a claim to the payor and the payor returns the amount that the customer pays). In some embodiments, the amount of a copay, the amount of a pro-rated copay, or the amount (or structure) of a tiered copay could be estimated based on previous adjudications of the medication for the customer or to the particular payor, and the cost determination module 115 could use the estimate to decide whether or not to adjudicate the refill of the prescription or charge the customer a retail cost or an alignment fee. Further, in some embodiments, the database 146 and/or the database 182 may not store the precise adjudication rules for a payor, a plan, etc. Instead, the values stored in the database 146 and/or the database 182 may reflect an estimate of the most restrictive values for a particular parameter, may reflect values determined based on previous adjudications, or may be entirely unknown. In the latter case, the pharmacy 112 or retail network 110 must adjudicate the prescription refill in order to determine whether the requirements of the particular provider have been satisfied. Thus, in some embodiments, the pharmacy 112 or the retail network 110 must choose between adjudicating the claim and charging the customer an amount returned by the payor, or not adjudicating the claim and charging the customer a retail cost, an alignment fee, etc.

Although the preceding text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the following claims.

A system for aligning refill dates associated with a plurality of prescriptions comprises a computer-readable storage medium and a set of instructions stored on the computer-readable storage medium. When executed, the instructions cause the system to align a plurality of selected prescriptions and determine a cost to the customer for the alignment. The cost to the customer may consist of an alignment fee or the cost of one or more intermediate fills. The cost of an intermediate fill may be a full copay amount, may be a pro-rated copay amount, may be one of a number of tiered copay amounts, may be the retail price for the intermediate fill, may be the contracted price for the intermediate fill, or may be a pro-rated retail price for the intermediate fill. The alignment fee may be a single alignment fee regardless of the number of prescriptions aligned, may be a set fee per prescription aligned, may be either a generic alignment fee or a brand name alignment fee for each prescription aligned, may be a set fee for each particular medication aligned, or may be a fee set by the quantity and type (generic or brand name) of each medication aligned.

We claim:

1. A non-transitory computer readable storage medium having instructions stored thereon and executable by a processor to perform a method for charging a customer for a prescription alignment service, the prescription alignment service offered by a pharmacy and aligning to a single alignment date refill dates associated with a plurality of prescriptions for a customer, the method comprising:
   receiving a selection of a plurality of prescriptions to align;
   determining a final alignment date;
   determining, for each of the plurality of selected prescriptions, whether an intermediate fill is required so that the customer does not exhaust a remaining day supply of the medication before the final alignment date;
   calculating one or both of an intermediate-fill day supply and an intermediate-fill quantity for any prescription requiring an intermediate fill;
   adjudicating each of the intermediate fills to determine an intermediate-fill payment amount in accordance with an agreement between the pharmacy and a third-party payor;
   causing any required intermediate fill to be filled and provided to the customer, based on either the intermediate-fill quantity or the intermediate-fill day supply for the prescription; and
   causing each of the selected prescriptions to be filled and charging either a customer or an insurance company for the prescription alignment service, or one or more intermediate fills, or both.

2. The computer readable medium of claim 1, wherein the intermediate-fill payment amount is proportional to the intermediate-fill day supply or the intermediate-fill quantity.

3. The computer readable medium of claim 1, wherein the intermediate-fill payment amount is determined by selecting a range into which the intermediate-fill day supply falls or by selecting a range into which the intermediate-fill quantity falls.

4. The computer readable medium of claim 1, wherein the intermediate-fill payment amount is the same as a co-payment amount for a prescribed day supply of the prescription medication.

5. The computer readable medium of claim 1, wherein determining the intermediate-fill payment amount further comprises:
   determining a retail price for the intermediate fill;
   determining a co-payment amount for a prescribed quantity of the prescription medication; and
   selecting the lesser of the retail price and the co-payment amount.

6. The computer readable medium of claim 1, wherein determining the intermediate-fill payment amount comprises multiplying the intermediate-fill quantity by a contracted price.

7. The computer readable medium of claim 1, wherein determining the intermediate-fill payment amount comprises:
   determining an intermediate-fill quantity by multiplying the intermediate-fill day supply by a dose; and
   multiplying the intermediate-fill quantity by a contracted price.

8. The computer readable medium of claim 1, wherein the intermediate-fill day supply is more than a prescribed day supply, and wherein the intermediate-fill payment amount is two times a co-payment amount for a prescribed day supply of the prescription medication.

9. A non-transitory computer readable storage medium having instructions stored thereon and executable by a processor to perform a method for charging a customer for a prescription alignment service, the prescription alignment service offered by a pharmacy and aligning to a single alignment date refill dates associated with a plurality of prescriptions for a customer, the method comprising:
   receiving a selection of a plurality of prescriptions to align;
   determining a final alignment date;
   determining, for each of the plurality of selected prescriptions, whether an intermediate fill is required so that the customer does not exhaust a remaining day supply of the medication before the final alignment date;
   calculating one or both of an intermediate-fill day supply and an intermediate-fill quantity for any prescription requiring an intermediate fill;
   determining an alignment fee amount;
   causing any required intermediate fill to be filled and provided to the customer, based on either the intermediate-fill quantity or the intermediate-fill day supply for the prescription; and
   causing each of the selected prescriptions to be filled and charging either a customer or an insurance company for the prescription alignment service, or one or more intermediate fills, or both.

10. The computer readable medium of claim 9, wherein the alignment fee amount is a fixed fee for the prescription alignment service.

11. The computer readable medium of claim 9, wherein the alignment fee is proportional to the number of prescriptions aligned by the prescription alignment service.

12. The computer readable medium of claim 9, wherein determining an alignment fee amount further comprises:
   determining the number of selected prescriptions comprising brand name medications;
   determining the number of selected prescriptions comprising generic medications;
   calculating a brand name medication alignment fee as the product of a first fee and the number of selected prescriptions comprising brand name medications;
   calculating a generic medication alignment fee as the product of a second fee and the number of selected prescriptions comprising generic medications;
   summing the brand name medication alignment fee and the generic medication alignment fee to determine a total alignment fee.

13. The computer readable medium of claim 9, wherein determining an alignment fee amount further comprises:
   determining an individual alignment fee for each of the selected prescriptions; and
   summing the individual alignment fees,
   wherein the individual alignment fee for each of the selected prescriptions is based on the prescribed medication.

14. The computer readable medium of claim 13, wherein the individual alignment fee for each of the selected prescriptions is further based on the intermediate-fill day supply for the respective selected prescription.

15. The computer readable medium of claim 9, wherein determining an alignment fee amount further comprises:
   determining an individual alignment fee for each of the selected prescriptions; and
   summing the individual alignment fees, wherein the individual alignment fee for each of the selected prescriptions is based on whether the prescribed medication is a brand name medication or a generic medication.

16. A prescription management system operable to align to a single alignment date refill dates associated with a plurality of prescriptions for a customer, the system comprising:

a network;

a computer coupled to the network;

a database comprising a plurality of customer records, a plurality of third-party payor records, and a plurality of medication information records;

an alignment engine for determining parameters associated with the alignment of the plurality of prescriptions, the alignment engine comprising computer readable instructions operable to cause a processor executing the instructions to:

receive a selection a plurality of prescriptions to align;

calculate a final alignment date; and calculate an intermediate-fill parameter; and a cost-determination module comprising computer readable instructions operable to:

cause a processor executing the instructions to adjudicate any required intermediate fills and to determine for each an intermediate-fill payment amount in accordance with an agreement between the pharmacy and a third-party payor, and charge for the prescription alignment service, or one or more intermediate fills, or both.

17. The system of claim 16, wherein the alignment engine further comprises computer readable instructions operable to cause a processor executing the instructions to calculate an intermediate-fill quantity for any intermediate-fill, and further wherein the intermediate-fill payment amount for each intermediate-fill is proportional to the intermediate-fill quantity.

18. The system of claim 16, wherein the alignment engine further comprises computer readable instructions operable to cause a processor executing the instructions to calculate an intermediate-fill quantity for any intermediate-fill, and further wherein the intermediate-fill payment amount is determined by selecting a range into which the intermediate-fill quantity falls.

19. The system of claim 16, wherein the intermediate-fill payment amount is the same as a co-payment amount for a prescribed day supply of the prescription medication.

20. The system of claim 16, wherein the alignment engine further comprises computer readable instructions operable to cause a processor executing the instructions to calculate an intermediate-fill quantity for any intermediate-fill, and wherein the cost determination module further comprises computer readable instructions operable to cause a processor executing the instructions to determine the intermediate-fill payment amount by multiplying the intermediate-fill quantity by a contracted price.

* * * * *